(12) United States Patent
Harmusz et al.

(10) Patent No.: US 11,124,254 B2
(45) Date of Patent: Sep. 21, 2021

(54) METHOD FOR PRODUCING A VEHICLE

(71) Applicant: MAGNA STEYR Fahrzeugtechnik AG & Co KG, Graz (AT)

(72) Inventors: Sabine Harmusz, Weitendorf (AT); Bernhard Hofer, Graz (AT); Wolfgang Passegger, Tillmitsch (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 25 days.

(21) Appl. No.: 15/876,191

(22) Filed: Jan. 21, 2018

(65) Prior Publication Data
US 2018/0229787 A1    Aug. 16, 2018

(30) Foreign Application Priority Data

Feb. 15, 2017  (EP) ..................................... 17156249
Apr. 28, 2017  (EP) ..................................... 17168669

(51) Int. Cl.
| | |
|---|---|
| *B62D 65/02* | (2006.01) |
| *B62D 25/20* | (2006.01) |
| *B62D 27/02* | (2006.01) |
| *C25D 13/14* | (2006.01) |
| *B62D 65/06* | (2006.01) |

(52) U.S. Cl.
CPC ......... *B62D 65/02* (2013.01); *B62D 25/2009* (2013.01); *B62D 27/023* (2013.01); *B62D 27/026* (2013.01); *B62D 65/06* (2013.01); *C25D 13/14* (2013.01); *B60Y 2304/05* (2013.01)

(58) Field of Classification Search
CPC ........ B62D 65/02; B62D 65/06; B62D 65/00; Y10T 29/49616; Y10T 29/49622; Y10T 29/49826
See application file for complete search history.

(56) References Cited

U.S. PATENT DOCUMENTS

| | | | |
|---|---|---|---|
| 4,978,164 A * | 12/1990 | Nakamura | B62D 25/025 156/92 |
| 6,726,438 B2 | 4/2004 | Chernoff et al. | |
| 6,843,336 B2 * | 1/2005 | Chernoff | B60N 2/90 180/65.1 |
| 10,501,134 B2 * | 12/2019 | Erlacher | B62D 65/06 |
| 2011/0165833 A1 * | 7/2011 | Schaefer | B05B 13/02 454/187 |
| 2012/0139292 A1 * | 6/2012 | Hofer | B62D 65/00 296/181.1 |

FOREIGN PATENT DOCUMENTS

| | | |
|---|---|---|
| DE | 102010030295 A1 | 12/2011 |
| EP | 2463181 A2 | 6/2012 |
| FR | 3026079 A1 | 3/2016 |
| JP | H0524563 A | 2/1993 |

* cited by examiner

*Primary Examiner* — Jason L Vaughan
*Assistant Examiner* — Amanda Kreiling
(74) *Attorney, Agent, or Firm* — Jordan IP Law, LLC; Todd A. Vaughn

(57) ABSTRACT

A method for producing a motor vehicle that includes producing and painting a bodyshell having a platform composed of metal and a vehicle body composed of metal which is configured for placement on the platform, producing and painting a main floor composed of metal separately from a remainder of the bodyshell, and attaching the main floor to the previously painted platform and/or the previously painted vehicle body.

16 Claims, 6 Drawing Sheets

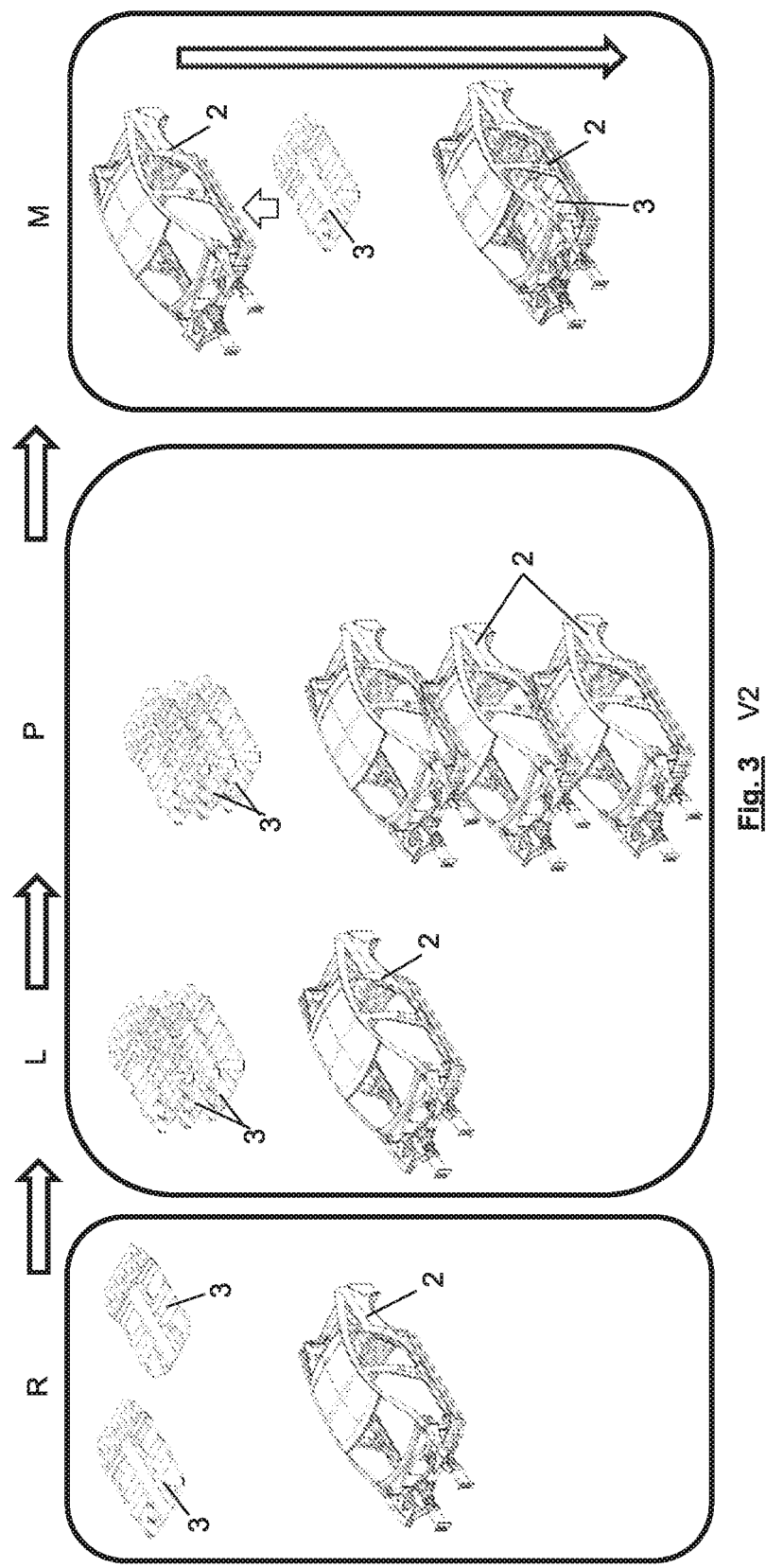

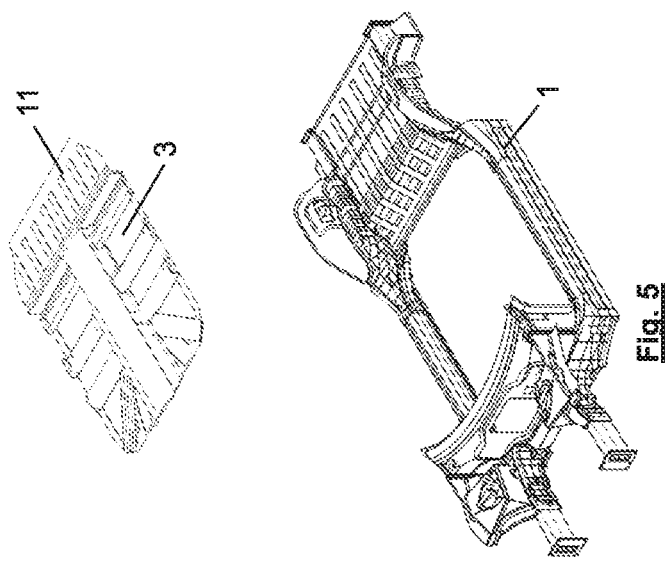
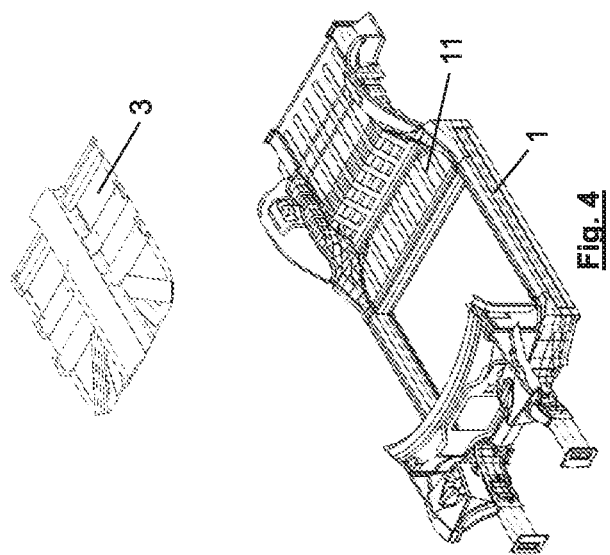

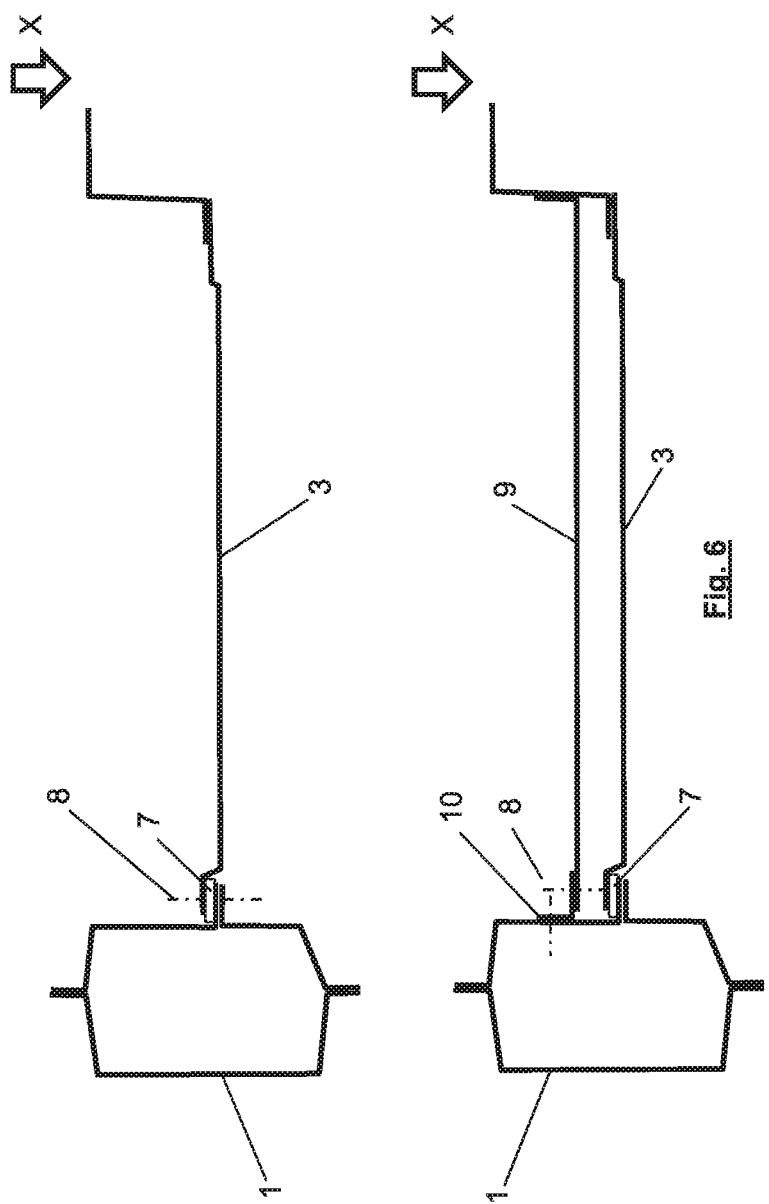

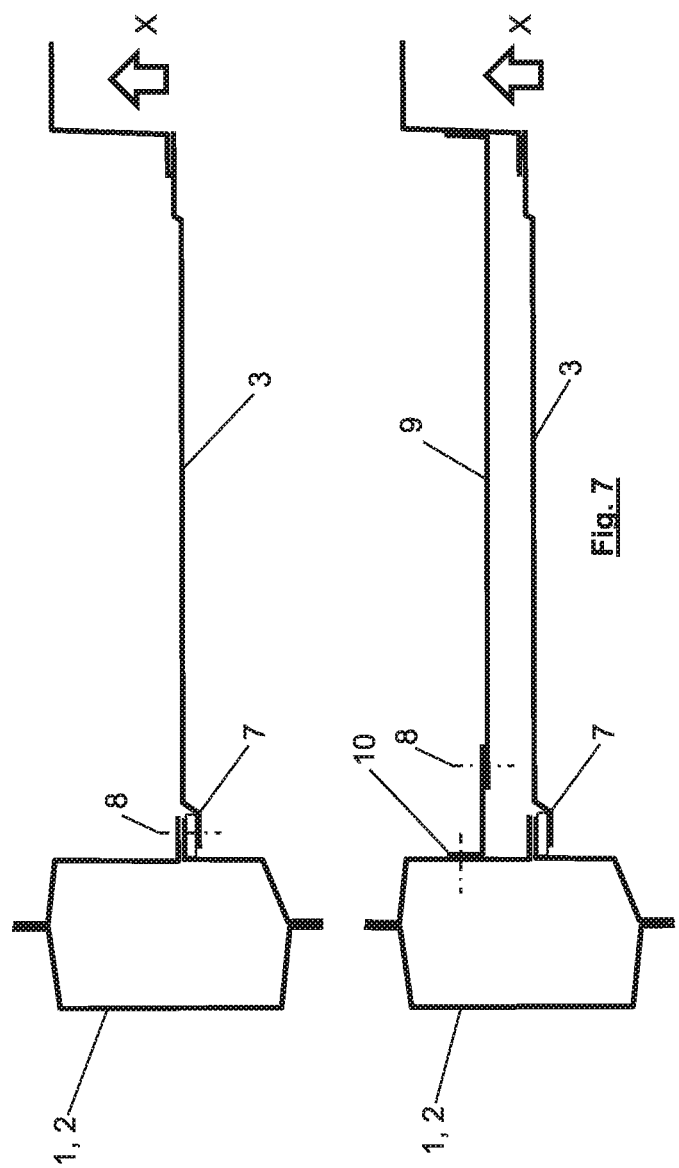

METHOD FOR PRODUCING A VEHICLE

CROSS-REFERENCE TO RELATED APPLICATIONS

The present application claims priority under 35 U.S.C. § 119 to European Patent Application Nos. EP 17156249.9 (filed on Feb. 15, 2017) and EP 17168669.4 (filed on Apr. 28, 2017), which are each hereby incorporated by reference in their respective entireties.

TECHNICAL FIELD

Embodiments relate to a method for producing a motor vehicle, and a method for producing a group of motor vehicles having different drive systems.

BACKGROUND

It is known that motor vehicles can be produced in various designs, for example with a self-supporting body, or with a non-self-supporting body which may be constructed on a supporting platform which could also be called a subframe, undercarriage or chassis.

A motor vehicle, as a so-called "bodyshell," may comprise such a platform composed of metal and a body composed of metal which is placed on the platform.

Various drive systems for motor vehicles are also known, such as petrol drive, electric drive, hybrid drive, or drive with alternative fuels such as natural gas, hydrogen and alcohol. These drive systems require different installation spaces in the vehicle architecture, in particular, in the floor region. Normally, the widely varying energy accumulators of the drive systems are located in this region. In conventional methods for producing motor vehicles, therefore, many different variants of bodies are required for combinations of different drive systems, different colors and different vehicle models, such as e.g. estate, saloon etc., which must be stored after painting for example in a storage zone (so-called "paint buffer") so that they can be retrieved rapidly for producing a desired complete vehicle.

SUMMARY

Embodiments relate to a method for producing a motor vehicle, and a method for producing a group of vehicles which allows a simpler and cheaper production of vehicles in different variants, in particular, drive system variants.

In accordance with embodiments, a method for producing a motor vehicle having a bodyshell that includes a platform composed of metal and a body composed of metal which is placed on the platform, the method comprising producing a main floor composed of metal separately from the remainder of the bodyshell, painting, for example, dip-coating, the main floor, and thereafter attaching the main floor to a previously dip-coated platform and/or a previously dip-coated body.

In accordance with embodiments, a main floor composed of metal, which may be configured for use for a specific drive system of the motor vehicle, may be produced and dip-coated separately from the remainder of the bodyshell, i.e., separately from the platform and also separately from the body. Such ready-painted main floors may then be stored compactly for further use with previously dip-coated platforms and/or previously dip-coated bodies which have been pre-prepared in parallel.

Embodiments thus allow late formation of body variants, which takes place only during assembly. By standardizing the bodyshell or substructures, i.e., the platforms and/or the bodies, the "paint buffer," i.e., the store of all body variants and paint variants after painting, in the production process can be reduced. The drive-specific main floors are simply dip-coated and then stacked compactly in the "paint buffer."

In accordance with embodiments, the feature "bodyshell" comprises the components of platform, main floor, and body.

In accordance with embodiments, at the time of attachment to the remainder of the bodyshell, the main floor comprises no attachments, i.e., is a non-equipped floor. In particular, the main floor may be formed by a single sheet metal part.

In accordance with embodiments, the platform and/or the body and/or the main floor are stored, at least temporarily, after dip-coating—and where applicable also after cover-coating—before fixing of the main floor to the remainder of the bodyshell. The main floor may thus be stored for further use in pre-painted form.

In accordance with embodiments, the previously painted main floor is attached, in particular bonded and/or bolted, to the platform in the mounting direction from above.

After fixing of the main floor to the platform, such as, for example, body modules (e.g., side wall modules, roof modules and/or rear end modules), are attached to the platform to form the body. The supporting structure for these body modules may be composed of metal.

In accordance with embodiments, at the time of fixing to the platform, the body modules may be already fitted out, for example with inner paneling, electrical wiring, carpets, and/or handles.

In accordance with embodiments, the main floor may be attached to a substantially complete body. Such attachment may take place via bonding, and/or mechanically (bolted), in a mounting direction from below.

In accordance with embodiments the complete body may be placed on the platform and attached thereto after the fixing of the main floor to the platform.

Embodiments relate to a method for producing a group of motor vehicles, comprising at least one first motor vehicle and at least one second motor vehicle, the first motor vehicle and the second motor vehicle may be produced as described hereinabove, in which identical main floors are attached to different platforms and/or to different bodies of the first and second motor vehicles. With such a method of production, it is therefore possible to use identical main floors for different bodies and/or platforms, for example, to form vehicles of different types or different colors. Therefore, fewer different designs of main floor need be kept in stock.

Also, for the first motor vehicle and the second motor vehicle, different main floors may be attached to otherwise identical platforms and/or identical bodies of the first motor vehicle and the second motor vehicle to create suitable floors for various drive systems, in which, however, the same bodies and/or platforms may always be used, which further simplifies stockholding.

DRAWINGS

Embodiments will be illustrated by way of example in the drawings and explained in the description below.

FIG. 3 illustrates a method for producing a vehicle, in accordance with embodiments.

FIG. 4 illustrates a main floor and a platform for a method, in accordance with embodiments.

FIG. 5 illustrates a main floor and a platform for a method, in accordance with embodiments.

FIG. 6 illustrates a sectional view of an embodiment for fixing a main floor to a platform.

FIG. 7 illustrates a sectional view of an embodiment for fixing a main floor to a platform.

DESCRIPTION

FIGS. 1-7 illustrate a method for producing a motor vehicle, in particular, a method for producing a plurality of motor vehicles in a production plant, in accordance with embodiments. Such embodiments include a first variant V1 and second variant V2. With these production methods, it is possible to supplement standard platforms and/or bodies with a drive-specific main floor during assembly.

Figure 1:
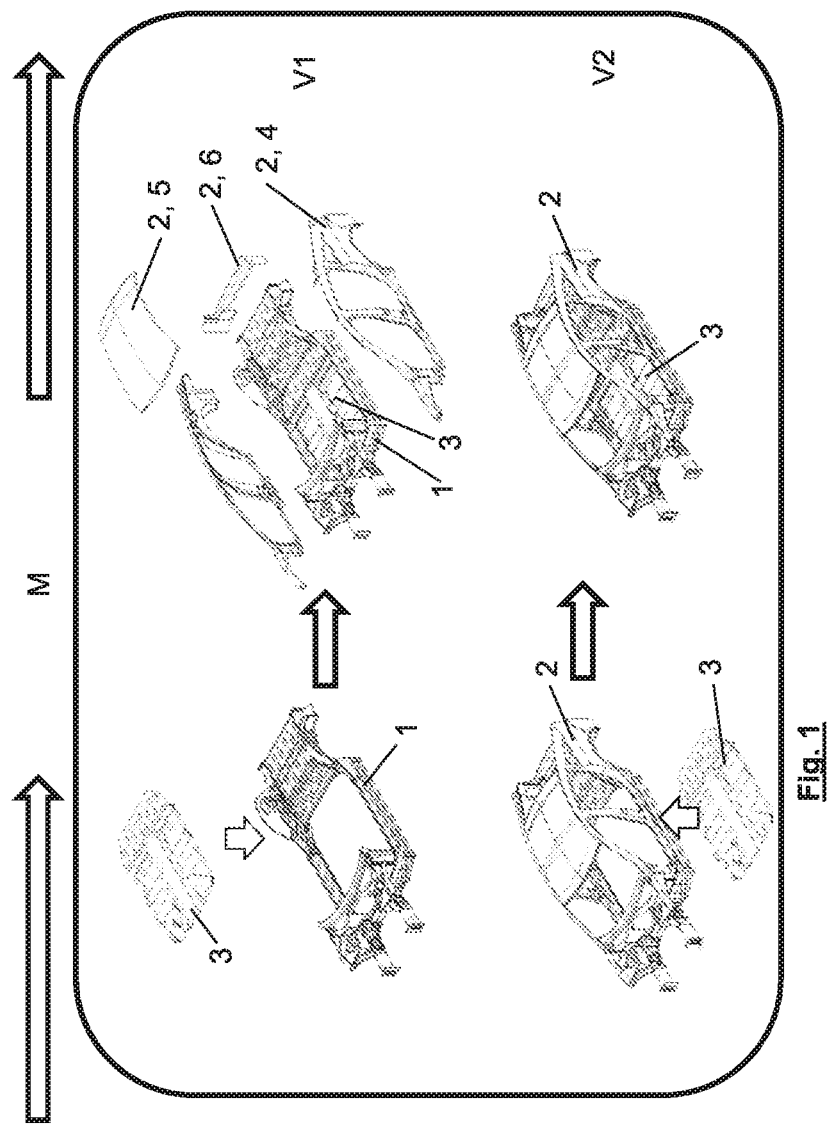
FIG. 1 illustrates a method for producing a vehicle, in accordance with embodiments.

FIG. 1 illustrates a depiction of the two main embodiments of the method according to the invention, namely variant V1, at the top and variant 2, V2, at the bottom of the diagram. Variant V1 is illustrated in more detail in FIG. 2, and variant V2 in FIG. 3.

Figure 2:
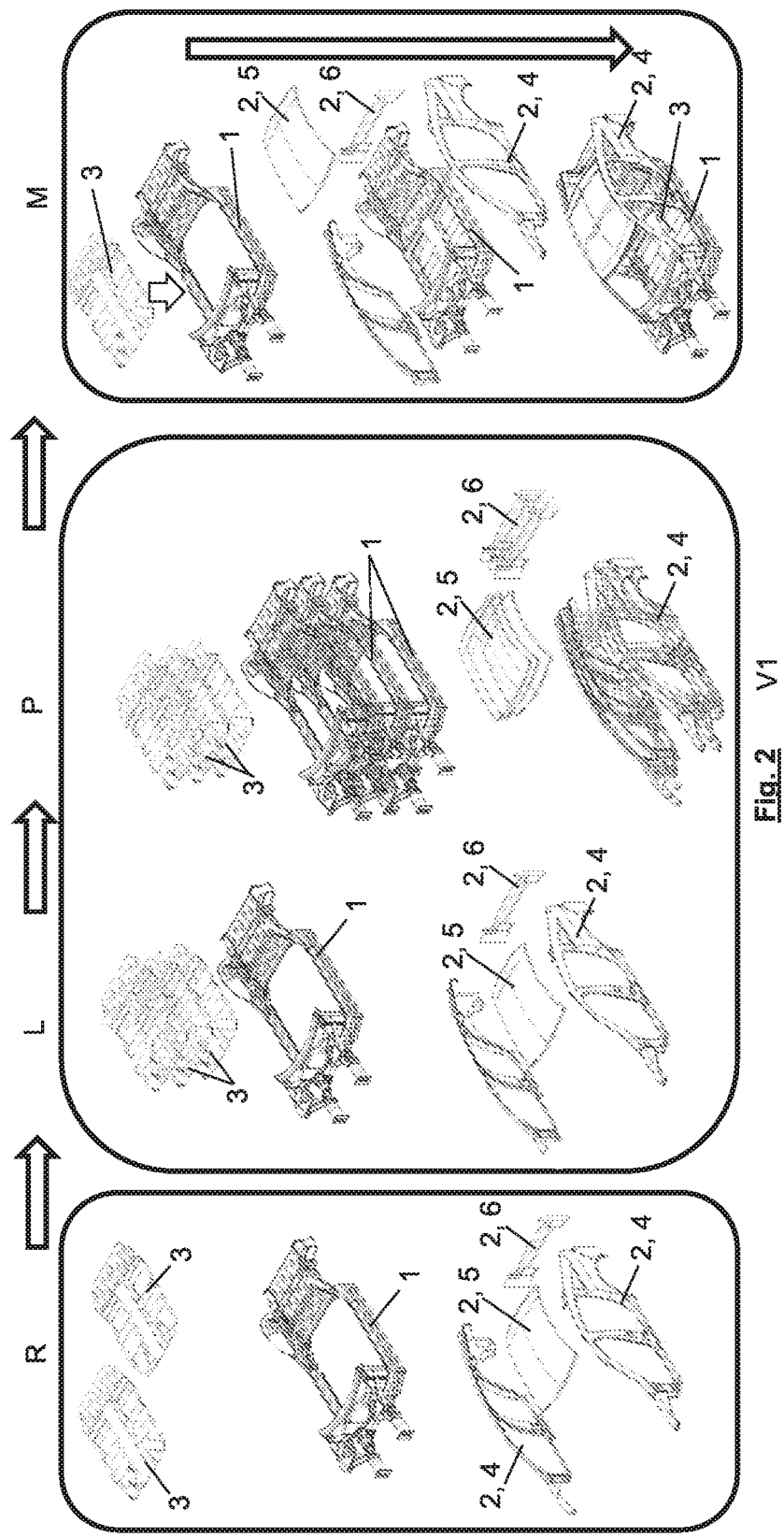
FIG. 2 illustrates a method for producing a vehicle, in accordance with embodiments.

As illustrated in FIG. 2, in variant V1, standard platforms 1 are produced in the bodyshell production plant R. In parallel, drive-specific main floors 3 and model-specific body modules 4, 5, 6 of a body 2, for example side walls 4, roof 5, and rear end 6, are produced.

Then these assemblies are dip-coated in the paintshop L and the model-specific body superstructure assemblies, i.e., body modules 4, 5, 6, are also cover-coated in a desired body color. It is also possible that only the supporting structure of at least one of these model-specific body modules 4, 5, 6 is composed of metal and this is only dip-coated, while the further outer paneling or visible elements attached thereto, i.e., parts of the equipment of the model-specific body modules such as paneling, trims, covers, cladding etc. are cover-coated. If these are not composed of metal, but for example of plastic, the dip-coating may be omitted.

In a "paint buffer" P, for example, a body warehouse for storage of bodies 2 and body modules, all assemblies, namely the main floors 3, platforms 1 and bodies 2 or their modules 4, 5, 6, are stored ready for retrieval.

The assemblies may be stacked compactly. In particular, only a few of the standard platforms 1 need be stored. Also, the model-specific body superstructure assemblies 4, 5, 6 require little space, since they are not yet welded into bulky bodies. Thus, many color variants can be implemented in a simple fashion. After retrieval of the model and drive-specific assemblies, the drive-specific floor assembly, i.e., the main floor 3, is joined to the standard platform 1 from above or from below. Thereafter, the now drive-specific platform 1, including the main floor 3, is equipped with electrics, chassis, drive system and similar equipment. In parallel, the model-specific body superstructure assemblies, i.e., body modules 4, 5, 6, are fitted out, if this has not already taken place.

In an assembly station M, in particular, a "framing station," these assemblies 1, 2, 3 are joined into a complete vehicle. Thus, the variant of the vehicle model is formed very late. Advantageously therefore, this achieves a short main line for assembly and a shift of the production contents to the preassembly lines with optimal accessibility, hence bringing advantages for production time.

As illustrated in FIGS. 4 and 5 (top diagrams), the drive-specific floor assembly, i.e., the main floor 3 which is adapted to different drive forms such as internal combustion engine, electric motor, hybrid drive etc., may also be configured differently in further aspects. The main floor 3 may for example either comprise the area of a rear seat support 11 (FIG. 5) or not (FIG. 4).

As illustrated in FIGS. 4 and 5 (lower diagrams), the platform 1 may also be prepared accordingly for receiving a main floor with or without a rear seat support 11, and therefore in particular be itself equipped without or with rear seat support 11. Advantageously, when the rear seat support region is included in the main floor 3, the seat geometry, i.e., the seat height, distance front to rear of all occupants, position in the vehicle longitudinal direction and transverse direction, and the energy accumulator geometry may be adapted in a single assembly, namely the main floor 3, with low tolerances.

Standard platforms 1 and (drive-)specific main floors 3, for example, single floor panels, are preferably dip-coated separately in parallel. Furthermore, assemblies of the body superstructure 2, such as for example, side wall modules 4, roof modules 5, rear end modules 6, are also painted, in any case cover-coated, and in the case of metal parts, further also dip-coated.

As illustrated in FIG. 7, in the actual vehicle assembly station M, the appropriate (drive-)specific floor assembly 3 for the respective vehicle model is installed in the standard platform 1 from below in the mounting direction X, and attached, for example, by bonding with adhesive 7 and optionally also via bolted connections 8. Alternatively, it would also be possible to install the main floor 3 in the platform 1 from above.

Alternatively, the body superstructure assemblies 4, 5, 6 may also be pre-equipped before mounting on the standard platform 1, and, for example, contain inner paneling, electrical wiring, carpet, handles etc. This variant normally leads to an even later variant formation in the production process, since the (body) structure is only joined late in the vehicle assembly process, i.e., the variants of estate, saloon, coupé etc. are only formed late in the production process.

As illustrated in FIG. 3, in variant V2, in a bodyshell production plant R, standard bodies 2 of a vehicle model are produced without floor assembly, i.e., without main floor 3. The main floors 3 are produced in parallel as drive-specific assemblies.

Then the standard bodies 2 and the drive-specific main floors 3 are dip-coated in a paintshop L and the body 2 is also cover-coated. In the "paint buffer" P, the bodies 2 in various colors are stored. The floor assemblies 3 are also stored there compactly.

After retrieval from store, the standard body 2 is fitted with the drive-specific main floor 3 in the assembly station M, wherein the main floor 3 is joined from below in the mounting direction X (see FIG. 7), and then passes through additional conventional assembly processes.

Due to the standardization of the bodies 2, a great deal of space can be saved in the storage zone of the "paint buffer" P, since only the various colors need be held in stock and not all the different drive-specific bodies, each in all colors. This production method may also be implemented in parallel with a conventional production method and take place in mixed mode. This creates the possibility of producing additional variants of a vehicle in a simple fashion.

As illustrated in FIGS. 6 and 7, in the assembly station M, a mounting adhesive 7 is provided as a joining technique for both variants V1 and V2, and preferably an additional bolted connection 8 which contributes to fixing the adhesive 7 for hardening and increases the stiffness and strength of the body.

FIGS. 6 and 7 each show cross-sections of a produced vehicle, namely in the region of a seat cross-member 9 (bottom) and outside such a seat cross-member 9 (top). The mounting direction X is depicted by an arrow each time, and in FIG. 6 runs from the top and in FIG. 7 from the bottom. In order to avoid blocking points and hence collisions on joining, these may be bridged with assembly parts such as fixing brackets 10 after joining. For example, seat cross-member 9 may be connected to a sill of platform 1 via brackets, in particular, via fixing brackets 10, in order to create a continuous load path.

Standard bodies 2 are dip-coated (cathodic dip-coating, CDC) and cover-coated (corresponding to the desired vehicle colors) and kept in stock (see FIG. 3, middle diagram, P). (Drive-)specific floor assemblies, i.e., main floors 3 which are not yet fitted out but still different from each other insofar as they are configured differently according to the various individual vehicle variants, are dip-coated in parallel/separately and kept in stock (see FIG. 3, middle diagram). Since in this way (only) the standard body 2 as a uniform body in the various colors need be stored, and not a plurality of body variants as usual in the prior art, this method brings the advantage of reducing the body storage area.

In the actual vehicle assembly station M, the specific main floor 3 adapted to the respective vehicle model is installed in the standard body 2, from below, and fixed by bonding with adhesive 7 (see FIG. 7). The main floor may then be fitted out further.

This solution may also be applied in a conventional assembly line, or the existing assembly line may be left unchanged since the essential difference/advantage lies in the actual storage of bodies or in the reduction in the multiplicity of actual body variants.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Platform
2 Body
3 Main floor
4 Side wall module
5 Roof module
6 Rear end module
7 Adhesive
8 Bolted connection
9 Seat cross-member
10 Fixing bracket
11 Rear seat support
V1 Variant 1
V2 Variant 2
R Bodyshell production plant
L Paintshop
P Paint buffer
M Assembly station

What is claimed is:

1. A method for producing a motor vehicle, comprising:
producing and painting by dip-coating a bodyshell having a platform composed of metal and a vehicle body composed of metal which is configured for placement on the platform;
producing and painting by dip-coating a main floor composed of metal separately from a remainder of the bodyshell, and then storing the painted main floor in a storage zone;
retrieving the painted main floor from the storage zone; and
attaching the painted main floor to the painted platform and/or the painted vehicle body.

2. The method of claim 1, wherein, at the time of attaching the painted main floor to the remainder of the bodyshell, the painted main floor comprises no attachments.

3. The method of claim 1, wherein attaching the painted main floor to the painted platform comprises bonding and/or bolting the painted main floor to the painted platform in a mounting direction from above.

4. The method of claim 3, further comprising, after attaching the painted main floor to the painted platform, forming the vehicle body by attaching body modules to the painted platform.

5. The method of claim 4, wherein the body modules comprises a side wall module, a roof module and/or a rear end module.

6. The method of claim 4, wherein the body modules, at the time of attaching to the painted platform, are already fitted out with inner paneling, electrical wiring, carpets, and/or handles.

7. The method of claim 1, wherein attaching the painted main floor to the painted vehicle body comprises bonding and/or bolting the painted main floor to the painted vehicle body in a mounting direction below.

8. The method of claim 7, further comprising, after attaching the painted main floor to the painted vehicle body, placing the painted vehicle body on the painted platform.

9. A method for producing a group of motor vehicles that includes at least one first motor vehicle and at least one second motor vehicle, the method comprising:
producing and painting by dip-coating, for the at least one first motor vehicle and the at least one second motor vehicle, a bodyshell having a platform composed of metal and a vehicle body composed of metal which is configured for placement on the platform;
producing and painting by dip-coating a main floor composed of metal separately from a remainder of the bodyshell, and then storing the painted main floor in a storage zone;

retrieving the painted main floor from the storage zone; and attaching the painted main floor to the painted platform and/or the painted vehicle body, wherein identical painted main floors are attached to different painted platforms and/or to different painted vehicle bodies of the at least one first motor vehicle and the at least one second motor vehicle.

10. The method of claim 9, wherein, at the time of attaching the painted main floor to the remainder of the bodyshell, the painted main floor comprises no attachments.

11. The method of claim 9, wherein attaching the painted main floor to the painted platform comprises bonding and/or bolting the painted main floor to the painted platform in a mounting direction from above.

12. The method of claim 11, further comprising, after attaching the painted main floor to the painted platform, forming the painted vehicle body by attaching body modules to the painted platform.

13. The method of claim 12, wherein the body modules comprises a side wall module, a roof module and/or a rear end module.

14. The method of claim 9, wherein attaching the painted main floor to the painted vehicle body comprises bonding and/or bolting the painted main floor to the painted vehicle body in a mounting direction below.

15. The method of claim 14, further comprising, after attaching the painted main floor to the painted vehicle body, placing the painted vehicle body on the painted platform.

16. A method for producing a group of motor vehicles comprising at least one first motor vehicle and at least one second motor vehicle, the method comprising:

producing and painting by dip-coating, for the at least one first motor vehicle and the at least one second motor vehicle, a bodyshell having a platform composed of metal and a vehicle body composed of metal which is configured for placement on the platform;

producing and painting by dip-coating a main floor composed of metal separately from a remainder of the bodyshell, and then storing the painted main floor in a storage zone;

retrieving the painted main floor from the storage zone; and attaching the painted main floor to the painted platform and/or the painted vehicle body, wherein different painted main floors are attached to identical painted platforms and/or to identical painted vehicle bodies of the at least one first motor vehicle and the at least one second motor vehicle.

* * * * *